United States Patent [19]

Wu

[11] Patent Number: 4,749,042

[45] Date of Patent: Jun. 7, 1988

[54] PETROLEUM SULFONATE ADJUVANTS IN EPOXY RESIN CORROSION-INHIBITING COMPOSITION

[75] Inventor: Yulin Wu, Bartlesville, Okla.

[73] Assignee: Phillips Petroleum Company, Bartlesville, Okla.

[21] Appl. No.: 917,750

[22] Filed: Oct. 10, 1986

Related U.S. Application Data

[62] Division of Ser. No. 749,366, Jun. 27, 1985, which is a division of Ser. No. 298,444, Sep. 1, 1981, abandoned.

[51] Int. Cl.$^4$ .............................................. E21B 43/00
[52] U.S. Cl. ..................................... 166/310; 166/902; 166/371; 523/177; 523/453; 106/14.27
[58] Field of Search .............................. 523/177, 453; 106/14.27; 166/310, 902, 371

[56] References Cited

U.S. PATENT DOCUMENTS 2,843,548  7/1958  Westlund, Jr. et al. .......... 106/14.27
3,427,190  2/1969  Murdock ............................ 523/455
4,157,991  6/1979  Pilla .................................... 524/46

FOREIGN PATENT DOCUMENTS 0611572  12/1960  Canada ............................ 106/14.27

*Primary Examiner*—Lewis T. Jacobs
*Assistant Examiner*—Robert F. L. Sellers, II
*Attorney, Agent, or Firm*—Hal Brent Woodrow

[57] ABSTRACT

A composition is provided which, when applied to a metal surface, forms a corrosion-inhibiting film thereon. The composition comprises an epoxy resin, and a petroleum sulfonate, usually in a hydrocarbon diluent. The composition can further comprise a polyamine, an alcohol or both. The composition is applied by contacting the metal surface with the composition as one solution or as a hydrocarbon solution of the epoxy resin and a solution comprising the petroleum sulfonate. The composition is particularly useful in the treatment of downhole metal surfaces in oil and gas wells to inhibit the corrosion of the metal.

10 Claims, No Drawings

PETROLEUM SULFONATE ADJUVANTS IN EPOXY RESIN CORROSION-INHIBITING COMPOSITION

BACKGROUND OF THE INVENTION

This application is a division of application Ser. No. 749,366, filed June 27, 1985, which is a division of application Ser. No. 298,444, filed Sept. 1, 1981 now abandoned.

This invention relates to the treatment of metal surfaces to increase their resistance to corrosion. It further relates to compositions which form a corrosion-resistant film on metal surfaces to which they are applied.

The problem of corrosion of metal surfaces in contact with air and water is well known. Corrosion and pitting are accelerated in environments in which metal surfaces are in contact with chemicals such as hydrogen sulfide, carbon dioxide and organic acids, and water having a high electrolyte concentration. Such environments are typical of down-well conditions in oil and gas wells, in which corrosion of metal pipes, pumps and other equipment poses a serious problem requiring monitoring of well sites, frequent maintenance and costly replacement of parts. Oil recovery operations in deep-sea oil fields present these corrosion problems in their most extreme form. The down-well metal surfaces are in contact with large quantities of corrosive chemicals such as dissolved acid gases present in the recovered oil, and, in addition, the metal surfaces are subjected to temperatures of 250° F. or higher and pressures of 3000 psig or higher, the extreme conditions of temperature and pressure acting to accelerate corrosion and to intensify the problems of applying and maintaining chemical protection for the equipment. In offshore oil wells, secondary recovery operations involving waterflooding of the undersea formations subjects the down-well equipment to highly corrosive sea water containing dissolved oxygen.

Conventional corrosion-inhibiting agents are often not effective at all under such extreme conditions or reduce corrosion for only a short period of time and then must be reapplied, often at great expense and inconvenience if the well site is not easily accessible or, as in the case of an off-shore well, poses difficulties of transporting and applying large volumes of chemicals.

It is therefore an object of this invention to provide a composition which can be applied to a metal surface to inhibit corrosion and pitting on the metal. It is a further object of the invention to provide a method of treating metal surfaces so as to form a film which inhibits corrosion on the metal even under extreme conditions of temperature and pressure and in highly corrosive environments. It is a further object of the invention to provide an article having a surface film of a composition which inhibits corrosion.

SUMMARY OF THE INVENTION

According to the invention, there is provided a composition which, when applied to a metal surface, forms a corrosion-inhibiting film on the metal surface, the composition comprising an epoxy resin and a petroleum sulfonate preferably and a hydrocarbon diluent. In one embodiment, the composition further comprises a polyamine. In another embodiment, the composition further comprises a polyamine and an alcohol. The composition can be applied by contacting the metal surface with the composition so that a film is formed thereon. The composition can be applied as one solution or by sequentially contacting the metal with a hydrocarbon solution of the epoxy resin and with the petroleum sulfonate. Also according to the invention, metal articles having a corrosion-inhibiting film thereon are provided.

DETAILED DESCRIPTION OF THE INVENTION

The invention corrosion-inhibiting composition comprises an epoxy resin and a petroleum sulfonate preferably in a hydrocarbon diluent. Suitable epoxy resins include any epoxy resin having, on the average, more than one vicinal epoxide group per molecule. The epoxy resin may be saturated or unsaturated, aliphatic, cycloaliphatic, aromatic or heterocyclic, and may bear substituents which do not materially interfere with the curing reaction. They may be monomeric or polymeric.

Suitable epoxy resins include glycidyl ethers prepared by the reaction of epichlorohydrin with a compound containing at least one hydroxyl group carried out under alkaline reaction conditions. The epoxy resin products obtained when the hydroxyl group containing compound is bisphenol A are represented below by structure I wherein n is zero or a number greater than 0, commonly in the range of 0 to 10, preferably in the range of 0 to 2.

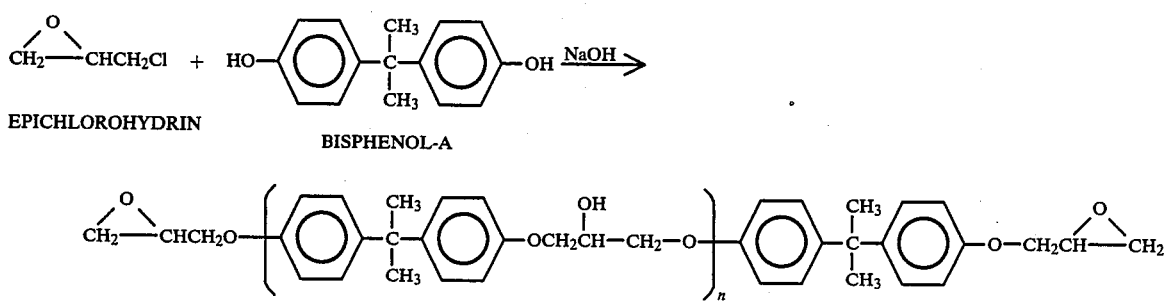

I

Other suitable epoxy resins can be prepared by the reaction of epichlorohydrin with mononuclear di- and tri-hydroxy phenolic compounds such as resorcinol and phloroglucinol, selected polynuclear polyhydroxy phenolic compounds such as bis(p-hydroxyphenyl)methane and 4,4'-dihydroxy biphenyl, or aliphatic polyols such as 1,4-butanediol and glycerol.

Epoxy resins suitable for use in the invention have molecular weights generally within the range of 50 to about 10,000, preferably about 200 to about 1500. The commercially available Epon ®828 epoxy resin, a reaction product of epichlorohydrin and 2,2-bis(4-hydroxyphenyl)propane (bisphenol A) and having a molecular weight of about 400, an epoxide equivalent (ASTM D-1652) of about 185–192, and an n value in structure I above of about 0.2, is presently preferred because of the superior effectiveness of an invention composition containing Epon 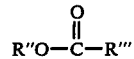828.

Additional epoxy-containing materials suitable for use in the present invention include the epoxidized derivatives of natural oils such as the triesters of glycerol with mixed long-chain saturated and unsaturated acids which contain, e.g., 16, 18 and 20 carbon atoms. Such natural oils are represented by formula II:

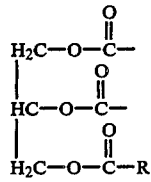

II wherein R represents alkyl and/or alkenyl groups containing 15 to 19 carbon atoms with the proviso that epoxidation of said oils yields a polyepoxide having more than one vicinal-epoxy group per molecule of epoxidized oil. Soybean oil is a typical triglyceride which can be converted to a polyepoxide suitable for use in the instant invention.

Other polyepoxides suitable for use in the present invention are derived from esters of polycarboxylic acids such as maleic acid, terephthalic acid, oxalic acid, succinic acid, azelaic acid, malonic acid, tartaric acid, adipic acid and the like with unsaturated alcohols as described by formula III:

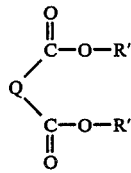

III wherein Q represents a valence bond, or the following groupings: 1,2-phenylene, 1,4-phenylene, methylene, dimethylene, trimethylene, tetramethylene, pentamethylene, hexamethylene heptamethylene, vinylene, 1,2-cyclohexylene, 1,4-cyclohexylene 1,2-ethylenediol and the like, and R' represents alkylene and branched alkylene groups containing 4 to 14 carbon atoms. Representative epoxidized esters derived from materials described by structure (III) include the following: di(2,3-epoxybutyl)tetrahydrophthalate, di(2,3-epoxyoctyl)oxalate, di(2,3-epoxyisobutyl)adipate, di(3,4-epoxypentyl)succinate, di(4,5-epoxydodecyl)terephthalate, di(3,4-epoxyhexyl)phthalate, di(2,3-epoxybutyl)tartrate, di(7,8-epoxytetradecyl)adiptate, di(e,4-epoxybutyl)glutarate, di(2,3-epoxyhexyl)pimelate, di(3,4-epoxyoctyl)suberate, di(4,5-epoxydecyl)azelate, di(2,3-epoxyisohexyl)tetrahydroterephthalate and the like.

In addition to the foregoing, it is contemplated that suitable polyepoxides can be derived from esters prepared from unsaturated alcohols and unsaturated carboxylic acids described by formula IV:

$$R''O-\overset{O}{\underset{\|}{C}}-R'''$$

IV wherein R'' represents alkenyl and cycloalkenyl groups containing 4 to 12 carbon atoms and R''' represents alkenyl and cycloalkenyl groups containing 4 to 12 carbon atoms. Representative epoxidized esters include the following: 2,3-epoxypentyl 3,4-epoxybutyrate; 2,3-epoxybutyl 3,4-epoxyhexanoate; 3,4-epoxyoctyl 2,3-epoxycyclohexane carboxylate; 2,3-epoxydodecyl 4,5-epoxyoctanoate; 2,3-epoxyisobutyl 4,5-epoxydodecanoate; 2,3-epoxycyclododecyl 3,4-epoxypentanoate; 3,4-epoxyoctyl 2,3-epoxycyclododecane carboxylate and the like.

Other unsaturated materials which can be epoxidized to give resins suitable for use in the instant process include butadiene based polymers such as butadiene-styrene copolymers, polyesters available as derivatives of polyols such as ethylene glycol with unsaturated acid anhydrides such as maleic anhydride, and esters of unsaturated polycarboxylic acids. Representative polyepoxides derived from the latter include the following: dimethyl 3,4,7,8-diepoxydecanedioate; dibutyl 3,4,5,6-diepoxycyclohexane-1,2-dicarboxylate; dioctyl 3,4,7,8-diepoxyhexadecanedioate; diethyl 5,6,9,10-diepoxytetradecanedioate and the like.

Dimers of dienes such as 4-vinylcyclohexene-1 from butadiene and dicyclopentadiene from cyclopentadiene can be converted to epoxidized derivatives which are suitable for use in the instant process.

A salt of a petroleum sulfonic acid is a component of the invention composition. Suitable petroleum sulfonates include ammonium, alkali metal and alkaline earth metal petroleum sulfonates. Methods of preparing petroleum sulfonates are known in the art and are described, for example, in U.S. Pat. Nos. 3,135,693 and 2,884,445. Neutralization of the so-called mahogany acids (oil-soluble petroleum sulfonic acids) with alkali metal hydroxides such as lithium hydroxide, sodium hydroxide and potassium hydroxide yield the corresponding alkali metal petroleum sulfonates which are useful as adjuvants in the present process. Commercially-available petroleum sulfonates such as those from Witco Chemical Company and Stepan Chemical Company can also be used as received or as the de-oiled petroleum sulfonates. The petroleum sulfonate adjuvants of the invention composition are obtainable from sulfonatable hydrocarbon feedstocks. The sulfonation can be carried out by conventional procedures such as $SO_3/SO_2$ or 20% oleum. The equivalent weights of the petroleum sulfonate components range, for the alkali metal and ammonium petroleum sulfonates, from about 250 to about 700, preferably about 350 to about 500, and most preferably about 390 to about 450. For the alkaline earth metal petroleum sulfonates, the equivalent weight can range from about 900 to about 1800, preferably about 1000 to about 1600 and most preferably about 1200 to about 1500.

In one embodiment of the invention, the composition further comprises a curing agent for the epoxy resin. Any agent effective for curing an epoxy resin can be used. Curing agents for epoxy resins include polyfunctional amines, acids, anhydrides and aldehyde resins. The curing agent is used in an amount effective for curing the amount of epoxy resin used.

Polyamines suitable for use in this embodiment include compounds having more than one N–H grouping. These include aliphatic, cycloaliphatic, aromatic and heterocyclic amines. Examples of curing compounds include aliphatic polyamines such as ethylenediamine, diethylenetriamine, triethylenetetramine, tetraethylenepentamine, 1,4-diaminobutane, 1,3-diaminobutane, hexamethylenediamine, 3-(n-propylamino)-propylamine, N,N'-diethyl-1,3-propanediamine, hexapropyleneheptamine, penta(1-methylpropylene)hexamine, tetrabutylenepentamine, hexa(1,1-dimethylethylene)heptamine, di(1-methylbutylene)triamine, pentaamylenehexamine, tri(1,2,2-trimethylethylene)tetramine, tetra(1,3-dimethylpropylene)pentamine, penta(1,5-dimethylamylene)hexamine, 5-methyl-1,9-nonanediamine, penta(1,2-dimethyl-1-isopropylethylene)hexane and N,N'-dibutyl-1,6-hexanediamine.

A class f polyamines particularly suitable for use in the invention are N-alkyl- and N-alkenyl-substituted 1,3-diaminopropanes and mixtures thereof. Examples of such polyamines include N-hexadecyl-1,3-diaminopropane, N-tetradecyl-1,3-diaminopropane, N-octadecyl-1,3-diaminopropane, N-pentadecyl-1,3-diaminopropane, N-heptadecyl-1,3-diaminopropane, N-nonadecyl-1,3-diaminopropane, and N-octadecenyl-1,3-diaminopropane. Various commercially available mixtures of N-alkylated and N-alkenylated diamines can be used in the invention. The presently preferred polyamine is a commercial product sold under the trademark Duomeen®T (trademark of Armour & Co.). This product is N-tallow-1,3-diaminopropane in which the majority of the tallow substituent groups are alkyl and alkenyl containing from 16 to 18 carbon atoms each, with a minority of substituent groups having 14 carbon atoms each. It is presently believed that the effectiveness of Duomeen®T in the corrosion-inhibiting composition stems from its relatively high molecular weight, which produces a long-chain "net" to cover the metal surface, its polyfunctionality, and its relatively high boiling point, which permits its use in high-temperature environments. Other commercially available materials include N-coco-1,3-diaminopropane in which the majority of the coco substituent groups contain 12 to 14 carbon atoms, commercially available under the tradename Duomeen®C, and N-soya-1,3-diaminopropane, which contains $C_{18}$ alkenyl groups along with a minor proportion of $C_{16}$ alkyl groups.

Additional polyamines suitable for use in the invention can contain 3 or more nitrogen atoms as illustrated by the following examples: N-dodecyldiethylenetriamine, N-tetradecyldiethylenetriamine, N-tetradecyldipropylenetriamine, N-tetradecyltriethylenetetramine and the corresponding N-alkenyl triamines.

Other curing agents which can be used include polyfunctional nitrogen-containing compounds such as, for example, amino acids, amino alcohols, amino nitriles, and amino ketones; carboxylic acids, and organic anhydrides.

In one embodiment of the invention, the composition comprises, in addition to the curing agent described above, an alcohol. Alcohols suitable for use in this embodiment include alkanols containing at least one —OH functional group and having 1 to about 15 carbon atoms, such as methanol, ethanol, 1-propanol, 2-propanol, butanols, pentanols, hexanols, heptanols, octanols, 1-pentadecanol, and mixtures of alkanols. Polyols containing 2 to 5 carbon atoms such as ethylene glycol, 1,3-propanediol, 2,3-butanediol, glycerol and pentaerythritol can also be used. Presently, methanol is preferred, particularly in an anti-corrosion composition containing xylene as the aromatic hydrocarbon diluent, Epon®828 as the epoxy resin, calcium petroleum sulfonate as the petroleum sulfonate, and Duomeen®T as the polyamine, because Duomeen®T is soluble in methanol at room temperature and because of the effectiveness of the resulting corrosion inhibiting system.

A hydrocarbon diluent is used for the invention composition. Examples of hydrocarbon diluents suitable for use in the treating agents include the isomeric xylenes, toluene, benzene, naphtha, cyclohexylbenzene, fuel oil, diesel oil, heavy aromatic oils, Stoddart solvent, crude oil, and condensate from gas wells. Presently, xylene is the preferred hydrocarbon diluent because it is an effective solvent for the other preferred components and because of the corrosion-inhibiting effectiveness of the resulting composition.

The higher boiling aromatic hydrocarbons are particularly useful for deeper wells with higher downhole temperatures and in high-temperature gas and oil wells generally.

In some treatment methods, discussed below, it is advantageous to employ a carrier liquid or drive fluid to force a slug of the corrosion-inhibiting composition down into the well being treated. Any of the hydrocarbons listed above as suitable diluents may be used. For practical and economic reasons, diesel oil, sea water or condensate from the well being treated are referred carrier fluids. An inert gas such as nitrogen can be used as a drive fluid.

Various alcohol-aromatic hydrocarbon azeotropes can be used in the alcohol-containing embodiment of the invention compositions to supply at least partially the diluent and the alcohol components. Representative azeotropes include the following, with the weight percent of each component in parenthesis: methanol (39.1)/benzene (60.9); ethanol (32)/benzene (68); 2-propanol (33.3)/benzene (66.7); 1-propanol (16.9)/benzene (83.1); isobutyl alcohol (9.3)/benzene (90.7); 1-butanol (68)/p-xylene (32); 2-pentanol (28)/toluene (72) and hexanol (13)/p-xylene (87). It is also contemplated that impure alcohol streams such as mixed butanols resulting from oxo technology using propylene feedstock can be used in the treating compositions.

The components of the corrosion-inhibiting system can be mixed in any order. The compositions are generally prepared within about two hours of their intended use, unless a cure-retarding agent or method is used. A stock solution of epoxy resin (3 parts by weight) in a hydrocarbon diluent (1 part by volume) is very convenient for formulation of the invention composition.

In that embodiment of the invention composition which comprises epoxy resin, petroleum sulfonate and hydrocarbon diluent and does not contain a curing agent or alcohol, the petroleum sulfonate either as a deoiled solid or as a solution in unsulfonated oil is added to a solution of epoxy resin (3 parts by weight) in a hydrocarbon diluent (1 part by volume). The weight percent of petroleum sulfonate in the final composition varies over the broad range of 0.01 to 98, preferably about 1.0 to about 80, most preferably about 5 to about 50.

The weight percent of epoxy resin in the final composition varies over the range of 1 to 98, preferably about 2 to about 50. The balance of the composition is hydrocarbon diluent in sufficient quantity to maintain the composition in an essentially fluid, pumpable state.

In the embodiment of the invention containing a polyamine, the petroleum either as a deoiled solid or as a solution in unsulfonated oil is added to a hydrocarbon solution of epoxy resin and polyamine. The weight ratio of polyamine to epoxy resin in the final solution varies over the range of about 1000:1 to about 1:500, preferably about 100:1 to 1:50 and most preferably about 10:1 to about 1:5. The weight percent of petroleum sulfonate in the final solution varies over the range of 1 to 97, preferably about 4 to about 90. The balance of the composition is hydrocarbon diluent in sufficient quantity to maintain the composition in an essentially fluid, pumpable state.

In the embodiment of the invention which contains an alcohol, the composition can be prepared by mixing a first solution of alcohol, hydrocarbon diluent and amine in, for example, approximately a 1:1:1 (mL:mL:g) ratio with a second solution of an epoxy resin in a hydrocarbon in about a 3:1 (g:mL) ratio. The weight ratio of polyamine to epoxy resin in the final solution varies over the broad range of about 1000:1 to 1:500, preferably about 100:1 to 1:50, and most preferably about 10:1 to 1:5. The petroleum sulfonate either as a deoiled solid or as a solution in unsulfonated oil is added to this solution so that the weight percent of petroleum sulfonate in the final composition varies over the range of 0.01 to 96, preferably about 1 to about 70, most preferably about 5 to about 50. The weight percent of alcohol in the final composition varies over the broad range of 1 to 99, preferably about 5 to about 80, and most preferably about 8 to about 60. The weight percent of epoxy resin in the final solution varies over the broad range of 0.01 to 96, preferably about 1 to about 50, most preferably about 5 to about 40 percent. The weight percent of polyamine in the final solution varies over the range of 0.01 to about 96, preferably about 1 to about 80, most preferably about 5 to about 60. The hydrocarbon diluent is present in sufficient quantity to maintain the composition in an essentially fluid, pumpable state.

The invention composition is useful for coating oxidizable metal surfaces, particularly surfaces of objects made from iron and steel. It is particularly useful for treating metal surfaces such as metal pipes and casings in oil, gas and geothermal wells, which are subjected to high temperatures and pressure and corrosive chemical agents, and for treating pipelines which carry fluids containing water.

Downhole treatments with the corrosion-inhibiting compositions can be effected by a variety of methods depending upon the particular chemical and physical characteristics of the well being treated. When treating metal surfaces, particularly in downhole applications, the corrosion-inhibiting composition can be applied as one solution, or alternatively it can be applied, for example, by contacting the metal surfaces sequentially with a solution containing a curing agent and a petroleum sulfonate and a solution of the epoxy resin. In practice, the resin solution and the petroleum sulfonate solution can be pumped from separate storage tanks to a static mixer at a T-juncture immediately prior to pumping the mixture downhole. The following downhole treatment methods can be used to apply the composition to metal surfaces of equipment used to recover natural fluids from a subterranean reservoir.

Batch Treatment

The invention composition comprising epoxy resin, petroleum sulfonate and hydrocarbon diluent is introduced preferably in an oil carrier into the annulus of a cased wellbore between the casing and the tubing. The well is returned to production and the injected compositions are gradually returned with the produced fluids, effecting en route the coating of contacted metal surfaces with a corrosion-resistant film. Alternatively in this method, a liquid column of the treating agent can be placed in the tubing or the annular space and allowed to stand for a time which can range from 10 minutes to 24 hours before resuming production, usually at least 1 hour.

Extended Batch Treatment

The invention composition is injected into the annular space of a cased wellbore, the well is closed off, and the composition is continuously circulated with well fluids down the annulus and up the tubing for an extended period of time which can vary widely but will usually be between 2 and 48 hours. At the end of the determined time period, the well is returned to production.

Squeeze Treatment

The invention composition is injected down a cased wellbore penetrating a subterranean formation and is forced into the formation against formation pressure with high-pressure pumps. The composition can be injected within a gelled or dispersed polymer matrix based, for example, on polyacrylamides, biopolysaccharides, or cellulose ethers. After the pressure is released, the treating agent is slowly produced back with the recovered fluids, resulting in the application of a corrosion-resistant film on metal surfaces contacted by the treating agent as it flows to the surface. This method is particularly suitable in high-pressure gas or oil wells.

Spearhead Treatment

A highly concentrated slug of the invention composition is injected into the tubing of a cased borehole and pressured down the tubing with nitrogen or a fluid column of a brine solution such as 2 weight percent aqueous potassium chloride. When the pressure is released, the aqueous brine column or nitrogen and the corrosion-inhibiting composition are produced up the tubing. The composition as a concentrated slug thus contacts the metal walls of the tubing and lays down a protective film as it flows in a downward and upward circuit.

Metal surfaces can also be protected by dipping or spraying the surfaces with the invention compositions and then allowing excess fluid to drain from the treated surfaces at ambient conditions. A protective film is thus formed on the metal surface without conventional heat-curing or extended air-drying treatment, although such drying treatments can be used if desired and if conditions permit it. The advantage in using an anti-corrosion system which does not require air- or heat-drying is that the system can be applied to metal surfaces which are hundreds or thousands of feet below ground level or in an environment which is always flooded with brine or other fluids.

When applying the composition to the metal tubing of, for example, a gas or oil well, it is not necessary to pre-coat the treated metal surfaces with oil or other substances prior to applying the invention composition, and the treated surfaces may or may not have an oil coating prior to the application. It is contemplated that the invention composition will provide effective corrosion inhibition in wells producing as much as 95 percent brine and 5 percent oil.

The nature of the film thus formed can vary according to the particular composition used and the environment in which it is applied, but it has been found that the film will generally be a soft, sticky layer adhering to the metal surface. It is not necessary that the composition harden to a tough coating, and it has been found in laboratory runs that the applied film tends to maintain a tacky or greasy consistency.

EXAMPLE 1

A series of laboratory corrosion inhibition tests were carried out in 1-liter Erlenmeyer flasks equipped with magnetic stirring bars, under laboratory conditions designed to simulate corrosive oil-water environments encountered in field drilling sites. A charge of 50 mL of crude oil and 950 mL of synthetic brine was used in each run. A slow stream of carbon dioxide was bubbled through the solution during each test to maintain the mixture near saturation with $CO_2$ at ambient conditions. After charging 950 ML of synthetic North Sea water (93.1 g $CaCl_2.2H_2O$, 46,4 g $MgCl_2.6H_2O$ and 781.1 g NaCl per 5 gal distilled $H_2O$) into the Erlenmeyer flasks, the corrosion inhibition systems were charged to the flask, then the specified crude oil was added. The rate of corrosion and pitting index were determined using a Corrater® monitoring system avilable from Rohrback Instruments. A carbon steel probe was suspended in the stirred oil-water mixture maintained at approximately 49° C. during each run.

Example 1 illustrates the operability of a 3-component composition of the invention. A 0.1 mL aliquot of a 50:50 v/v mixture of xylene and Phil-AD ®-N lube oil additive (containing calcium petroleum sulfonate) was mixed with a 0.1 mL aliquot of a xylene solution of Epon®828 epoxy resin. The epoxy resin solution was prepared by mixing 3 parts by weight Epon®828 with 1 part by volume xylene. A control run was carried out with Phil-AD ®-N in xylene (see run 2 in Table 1). Run 3 is an additional invention run in which a xylene/epoxy resin/petroleum sulfonate mixture aged for 2 hours before testing was initiated. The results of these runs are shown in Table 1.

TABLE 1

| Run No. | Test Period (hrs.) | Corrosion Rate (mpy) | Pitting Index | Remarks |
|---|---|---|---|---|
| 1 (Invention) | 0.67 | 0.03 | 0.08 | The petroleum sulfonate and epoxy resin system was tested immediately after mixing. |
|  | 1.67 | 0.03 | 0.30 |  |
|  | 2.67 | 0.00 | 0.12 |  |
|  | 3.5 | 0.02 | 0.08 |  |
|  | .20 | 0.0 | 0.04 |  |
| 2 (Control) | 1.25 | 3.9 | 1.2 | The petroleum sulfonate was mixed with xylene for this run. |
|  | 16.25 | 0.7 | 2.8 |  |
|  | 20.5 | 0.02 | 0.22 |  |
| 3 (Invention) | 0.67 | 2.1 | 1.1 | The petroleum sulfonate and epoxy resin system was aged for 2 hours at ambient temperature before testing. |
|  | 1.67 | 1.6 | 0.5 |  |
|  | 2.67 | 1.0 | 0.1 |  |
|  | 3.5 | 0.37 | 0.01 |  |
|  | .20 | 0.01 | 0.01 |  |

Referring to invention runs 1 and 3, it is evident that the petroleum sulfonate, epoxy resin and xylene system lowers the corrosion rate more quickly than the petroleum sulfonate and xylene system. The petroleum sulfonate used in these runs was calcium petroleum sulfonate prepared by the method of U.S. Pat. No. 3,135,693. Run 3 suggests that aging the petroleum sulfonate, epoxy resin and xylene system for 2 hours increases the time necessary for lowering the corrosion rate.

EXAMPLE 2

This example illustrates the operability of the embodiment of the invention composition containing a polyamine. The test was carried out using a Corrator device as described in Example 1. A 0.2 mL aliquot of a 1:1:1 mixture of Phil-AD®-N, xylene and Duomeen®T was mixed with 0.05 mL of a 3:1 (wt:wt) Epon®828 and xylene solution to form the treating composition. A control run (see run 5 in Table 2) was carried out with a treating mixture containing xylene, Duomeen®T, Epon 828 and methanol but no petroleum sulfonate. The results of these runs are shown in Table 2.

TABLE 2

| Run No. | Test Period (hrs.) | Corrosion Rate (mpy) | Pitting Index | Remarks |
|---|---|---|---|---|
| 4 (invention) | 0.67 | 1.0 | 0.1 | Calcium petroleum sulfonate replaced the methanol of control run 5. |
|  | 1.67 | 0.32 | 0.1 |  |
|  | 2.67 | 0.16 | 0.0 |  |
|  | 3.5 | 0.08 | 0.1 |  |
|  | 19.5 | 0.02 | 0.0 |  |
| 5 (control) | 0.67 | 4.3 | 1.0 | This system contains methanol, xylene, Epon ® 828 and Duomeen ® T. |
|  | 1.67 | 0.7 | 0.3 |  |
|  | 2.67 | 0.39 | 0.14 |  |
|  | 3.5 | 0.18 | 0.08 |  |
|  | 19.5 | 0.03 | 0.02 |  |
| 6 (invention) | 1.0 | 0.04 | 0.02 | Sodium petroleum sulfonate replaced the methanol of control run 5. |
|  | 1.75 | 0.03 | 0.02 |  |
|  | 17 | 0.01 | 0.04 |  |
|  | .19 | 0.01 | 0.04 |  |

Referring to Table 2, it is evident that the use of petroleum sulfonate rather than methanol in the epoxy resin, xylene and polyamine system resulted in a more rapid lowering of the corrosion rate. The methanol containing system has been found to be an effective corrosion inhibitor. The petroleum sulfonate used in run 4 was calcium petroleum sulfonate prepared by the method of U.S. Pat. No. 3,135,693. Run 6 is an additional invention run using a commercially available sodium petroleum sulfonate (Witco TRS 10-410). In run 6, a stock test solution was prepared by mixing 6 g xylene, 2 g Witco TRS 10-410 and 2 g Duomeen T. A 0.2 mL aliquot of this solution was used in run 6 together with a 0.05 mL aliquot of Epon 828 in xylene (3 parts by weight Epon 828 with 1 part by weight xylene).

EXAMPLE 3

This example illustrates the operability of the embodiment of the invention which contains an alcohol. The tests were carried out using a Corrator device as described in Example 1. Run 7 (see Table 3) is an invention run involving the addition of calcium petroleum sulfonate (Phil-AD ®-N oil additive) to the Epon 828, Duomeen T, methanol and xylene system. Run 8 in Table 3 is a control run using the Epon 828, Duomeen T, methanol and xylene system. Run 9 is an invention run using sodium petroleum sulfonate (Witco TRS 10-410) as the petroleum sulfonate. The approximate composition of the TRS 10-410 (as received) is 61% by weight sodium petroleum sulfonate, 30 to 35% by weight unsulfonated oil and 4 to 5% by weight water. The average equivalent weight of the sodium petroleum sulfonates varies over the range of 410 to 430.

In run 9, the TRS 10-410, as received, was mixed with equal volumes of xylene and methanol to give a mixture of 1:1:1 petroleum sulfonate solution:xylene:methanol. Separate solutions of amine and resin were prepared as follows: The Duomeen T solution was prepared by mixing Duomeen T, xylene and methanol in a 1:1:1 ratio (g:mL:mL) and the epoxy resin solution was prepared by dissolving 3 parts by weight of Epon 828 in 1 part by weight xylene. The treating composition (run 9) was then prepared by mixing 0.25 mL of the petroleum sulfonate mix with 0.02 mL of the amine mix and 0.05 mL of the resin mix. The results of corrosion tests are reported in Table 3.

TABLE 3

| Run No. | Test Period (hrs.) | Corrosion Rate (mpy) | Pitting Index | Remarks |
|---|---|---|---|---|
| 7 (invention) | 1.5 | 0.02 | 0.01 | This test mixture contained calcium petroleum sulfonate, methanol, Epon ® 828, Duomeen ® T and xylene. |
|  | 2.67 | 0.02 | 0.01 |  |
|  | .19 | 0.01 | 0.01 |  |
|  | .22 | 0.01 | 0.01 |  |
| 8 (control) | 0.67 | 4.3 | 1.0 | This test mixture contained methanol, Epon ® 828, Duomeen ® T and xylene. |
|  | 1.67 | 0.7 | 0.3 |  |
|  | 2.67 | 0.39 | 0.14 |  |
|  | 3.5 | 0.18 | 0.08 |  |
|  | 19.5 | 0.03 | 0.02 |  |
| 9 (invention) | 1.0 | 0.1 | 0.0 | The test mixture contained sodium petroleum sulfonate, methanol, Epon ® 828, Duomeen ® T and xylene. |
|  | 1.5 | 0.01 | 0.0 |  |
|  | 19 | 0.01 | 0.04 |  |

The results shown in Table 3 show the effectiveness of the invention composition in rapidly reducing the corrosion rate to a very low level.

That which is claimed is:

1. A method for treating the metal surfaces of drilling equipment comprising:
    injecting a composition comprising an epoxy resin, a petroleum sulfonate, and a hydrocarbon diluent into the downwell environment of a gas or oil well wherein said downwell environment is characterized by the presence of at least one of the following:
    (a) hydrogen sulfide
    (b) carbon dioxide
    (c) organic acids
    (d) water having a high electrolyte concentration
    (e) high temperature and high pressure
    and allowing the composition to contact the metal surfaces for a time sufficient to form a corrosion-inhibiting film thereon.

2. A method for inhibiting the corrosion of metal surfaces of drilling equipment comprising the steps of:
    (A) stopping production of the natural fluids;
    (B) injecting a composition comprising an epoxy resin, a petroleum sulfonate, and a hydrocarbon diluent into the downwell environment of a gas or oil well wherein said downwell environment is characterized by the presence of at least one of the following:
    (i) hydrogen sulfide
    (ii) carbon dioxide
    (iii) organic acids
    (iv) water having a high electrolyte concentration
    (v) high temperature and high pressure, and;
    (C) returning the well to production, thereby causing the composition to be returned with the natural fluids and to be deposited as a corrosion-inhibiting film en route on metal surfaces with which it comes in contact.

3. A method according to claim 2 in which the drilling equipment includes tubing within a well casing, the method further comprising injecting the composition comprising an epoxy resin, a petroleum sulfonate, and a hydrocarbon diluent between the tubing and casing, and circulating the composition through the tubing and between the tubing and casing for a time at least sufficient to form a corrosion-inhibiting film thereon before returning the well to production.

4. The method of claim 1 or claim 2 in which the composition is forced down the well using a drive fluid.

5. The method of claim 2 in which at least a portion of the well is at a temperature of at least about 250° F. and a pressure of at least about 3000 psig.

6. The method of claim 1 in which at least a portion of the well is at a temperature of at least 250° F. and a pressure of at least about 3000 psig.

7. The process of claim 1, wherein said epoxy resin is present in the quantity of from 1 to 98 weight percent, said petroleum sulfonate is present in the quantity of from about 1.0 to about 80 weight percent and said hydrocarbon diluent is present in a quantity sufficient to maintain the composition in an essentially fluid, pumpable state.

8. The process of claim 2, wherein said epoxy resin is present in the quantity of from 1 to 98 weight percent, said petroleum sulfonate is present in the quantity of from about 1.0 to about 80 weight percent and said hydrocarbon diluent is present in a quantity sufficient to maintain the composition in an essentially fluid, pumpable state.

9. The process of claim 1, wherein
    (a) said epoxide is a reaction product of epichlorohydrin and 2,2-bis(4-hydroxyphenyl)propane, having a molecular weight of about 400 and an epoxide equivalent of about 185 to 192;
    (b) said petroleum sulfonate is selected from the calcium and sodium salts of petroleum sulfonic acids; and
    (c) said diluent is xylene.

10. The process of claim 2, wherein
    (a) said epoxide is a reaction product of epichlorohydrin and 2,2-bis(4-hydroxyphenyl)propane, having a molecular weight of about 400 and an epoxide equivalent of about 185 to 192;
    (b) said petroleum sulfonate is selected from the calcium and sodium salts of petroleum sulfonic acids; and
    (c) said diluent is xylene.

* * * * *